United States Patent [19]

Iovine et al.

[11] 4,131,576
[45] Dec. 26, 1978

[54] PROCESS FOR THE PREPARATION OF GRAFT COPOLYMERS OF A WATER SOLUBLE MONOMER AND POLYSACCHARIDE EMPLOYING A TWO-PHASE REACTION SYSTEM

[75] Inventors: Carmine P. Iovine; Dilip K. Ray-Chaudhuri, both of Bridgewater, N.J.

[73] Assignee: National Starch and Chemical Corporation, Bridgewater, N.J.

[21] Appl. No.: 860,951

[22] Filed: Dec. 15, 1977

[51] Int. Cl.² ............................................. C08L 51/02
[52] U.S. Cl. .............................................. 260/17.4 GC
[58] Field of Search ................................ 260/17.4 GC

[56] References Cited

U.S. PATENT DOCUMENTS

| | | | |
|---|---|---|---|
| 3,211,708 | 10/1965 | Zimmermann et al. | 260/78.5 |
| 3,656,884 | 4/1972 | Okaya et al. | 260/17.4 GC |
| 3,809,664 | 5/1974 | Fanta et al. | 260/17.4 GC |
| 3,957,739 | 5/1976 | Cabestany et al. | 526/207 |
| 3,976,552 | 8/1976 | Fanta et al. | 204/159.12 |
| 4,028,290 | 6/1977 | Reid | 260/17.4 GC |

OTHER PUBLICATIONS

Gray et al., *Die Starke* 14, pp. 239–246, 1962.

*Primary Examiner*—M. J. Welsh
*Attorney, Agent, or Firm*—Edwin Szala; Ellen T. Dec

[57] ABSTRACT

Graft copolymers of a water soluble monomer and polysaccharide are prepared employing a two-phase reaction system under controlled conditions. The resultant graft copolymers are formed at high grafting efficiency and high conversion and obtained as precipitated solid beads.

11 Claims, No Drawings

PROCESS FOR THE PREPARATION OF GRAFT COPOLYMERS OF A WATER SOLUBLE MONOMER AND POLYSACCHARIDE EMPLOYING A TWO-PHASE REACTION SYSTEM

BACKGROUND OF THE INVENTION

I. Field of the Invention

This invention relates to a process for preparing graft copolymers of water soluble monomers and polysaccharides. More specifically it relates to a process for the production of graft copolymers of polysaccharide substrates and water soluble monomers under controlled conditions such that the graft copolymer is produced efficiently and at high conversion and is readily isolated in the form of solid beads.

II. Brief Description of the Prior Art

Polymers derived from grafting water soluble monomers to carbohydrates find uses in a variety of applications including use as paper filler retention aids, adhesives, sizings, flocculants, ion exchange resins, drilling mud additives, and water treatment aids.

Method for preparing graft copolymers of polysaccharides such as starches, cellulose and gums are well known in the literature. See, for example, *Block and Graft Copolymerization*, Vol. 1, R. J. Ceresa, ed., John Wiley and Sons (1973). Such methods, as represented by the teachings of U.S. Pat. Nos. 3,809,644 and 3,976,552, include polymerizations in water, in water-solvent mixtures and in the dry state, and may be initiated by mechanical, chemical and irradiative techniques.

Most of the above-described methods, however, are relatively unsuited for the efficient grafting of water soluble monomers in aqueous environments where polymerization with these monomers would be most desirable, particularly when chemical initiators are employed. This inefficient grafting is mainly due to the strong tendency of these monomers to form separate non-graft polymers in the aqueous phase. For efficient grafting, it is necessary to maintain the polysaccharide substrate and the water soluble monomer(s) in very close contact i.e. at high concentration with respect to the aqueous polymerization medium. In this manner, graft polymerization becomes the dominant reaction and the tendency to form non-graft polymers is minimized.

Several factors, however, prevent the grafting of water soluble monomers to polysaccharide substrates in highly concentrated aqueous environments. With water soluble or dispersed substrates like cellulose derivatives, gums and cooked starches, the aqueous solution viscosities of even low concentrations (10–20%) of polysaccharide in water are prohibitively high and unmanageable. Thus it is not possible to graft a water soluble monomer, e.g. acrylic acid, to a soluble or dispersed polysaccharide substrate in water at, for example, 70% solids. With non-dispersed polysaccharide substrates like cellulose and uncooked starch, which can be heterogeneously suspended in water at 40–60% solids, the graft product itself once produced in water will swell and exhibit very high viscosities during polymerization. This effect usually leads to coagulation of the reaction mixture making it commercially useless.

It is therefore an object of the present invention to provide a simple and efficient process for preparing graft copolymers of polysaccharide and water soluble monomers.

It is also an object of the invention to provide such process wherein the graft polymerization may be carried out in aqueous environments at high concentrations yielding high conversion products while avoiding the viscosity related problems of prior art aqueous techniques.

It is a further objection to provide a process for the production of such graft copolymers which can be isolated directly from the reaction mixture in the form of solid beads.

SUMMARY OF THE INVENTION

The above-mentioned and related objects are achieved in accordance with the process of the present invention which comprises suspending the polysaccharide in an organic polymerization solvent and adding thereto a water solution of the monomer to be grafted. Graft polymerization of the resultant two-phase mixture is carried out in the presence of a free radical catalyst with agitation at a temperature of from about 40° to 100° C., wherein it is required that at least one of the phases i.e. the suspended polysaccharide or the aqueous monomer solution) contain a suitable surfactant. It is important that the organic solvent used in the polysaccharide phase be immiscible with the aqueous monomer solution phase, that it not dissolve the monomer or graft copolymer as it is formed and that it have a boiling point at or above the temperature of the polymerization reaction.

In accordance with the process of the present invention, the resultant mixture of suspended polysaccharide and aqueous monomer solution, etc. forms a discontinuous phase comprising a multitude of discrete spheres suspended in a continuous immiscible organic solvent phase, each sphere consisting of a self-contained aqueous polymerization system containing both polysaccharide substrate and monomer as well as water, catalyst, and buffer, if present, in proportions such that the solids content is greater than 50% by weight of the total aqueous polymerization system. This suspension of discrete spheres is then deoxygenated and heated to initiate and effect polymerization. The spheres retain their integrity throughout the polymerization reaction, and on completion of the polymerization, are readily isolated in bead or granular form by filtration and drying.

As a result of the high solids concentration at which the polymerization reaction is carried out, the resultant graft copolymers are formed at high grafting efficiency, generally in excess of 75%, and high conversion, and as such, are desirable for use in a wide variety of end-use applications.

An additional feature of the process of the present invention is that it enables the production of graft copolymers which can be subsequently reacted with other reactants without the necessity for isolation of the intermediate graft copolymer.

DETAILED DESCRIPTION OF THE PREFERRED EMBODIMENTS

The polysaccharide substrates suitable for use in the practice of this invention include starches and starch conversion products derived from any plant source; starch ethers and esters; cellulose and cellulose derivatives and various plant gums. The substrate may be used in water soluble or water insoluble form.

Starches including those derived from corn, potato, wheat, rice, sago, tapioca, waxy maize, sorghum and amylose, as well as the conversion products and derivatives thereof, are the preferred substrates due to their cost and availability.

The amount of polysaccharide substrate may vary from 10 to 90%, preferably 40-70%, by weight of the final graft polymer of this invention.

The polysaccharide is suspended in an organic solvent thereby forming a continuous phase which, optionally, may contain a solvent-soluble surfactant (to be discussed hereinbelow) in an amount of 1-12% by weight of the solvent. The solvent chosen must be one which is immiscible with water, which does not dissolve the polysaccharide or the monomer or the graft copolymer as it is formed, and which has a boiling point at or above the temperature at which the graft polymerization reaction will be carried out. Suitable solvents are selected from aromatic and aliphatic hydrocarbons as well as certain chlorinated hydrocarbons and include benzene, dichlorobenzene, toluene, xylene, 1,2-dichloroethane, heptane, octane, isooctane and nonane as well as other solvents within the described parameters known to those skilled in the art. Mixtures of such solvents may also be used.

Monomers which are suitable for the practice of the process of this invention are water soluble (i.e. they have a minimum solubility of 5% by weight in water at 25° C.), are unsaturated and are capable of polymerizing by free radical initiation. Such monomers include acrylic and methacrylic acid; acrylamide, methacrylamide, acrylonitrile; N,N-dialkylaminoalkyl acrylates and methacrylates (wherein the alkyl group contains 1 to 4 carbon atoms); ethylenically unsaturated quaternary ammonium salts such as N,N,N-trimethylaminoethyl methacrylate methyl sulfate or halide, 2-hydroxy-3-methacryloxypropyl trimethyl ammonium methyl sulfate or halide, vinyl benzyl trialkyl ammonium methyl sulfate or halide, dialkyl diallyl ammonium methyl sulfate or halide; sodium or ammonium styrene sulfonate; vinyl pyrrolidone; hydroxy alkyl acrylates and methacrylates; sodium 2-acrylamide-2-methyl propane sulfonate, etc. Various other water-soluble monomers suitable for graft polymerization with polysaccharides are known to those skilled in the art.

The water-soluble monomers may be used as the sole component of the graft or they may be used as comonomers with each other. The ratio and type of comonomer will depend upon the particular components and designated end-use thereof. Thus, the total amount of water soluble monomer may range from 10 to 90%, preferably 30 to 60%, by weight of the final graft polymer. The particular monomer or monomers are employed in the form of an aqueous solution which may also contain a water-soluble surfactant in an amount of from 0.5-12% based on the weight of the polysaccharide substrate.

The catalyst systems employed in the practice of the present invention are those generally employed in the literature for grafting of the particular monomers onto polysaccharide substrates. The particular catalyst chosen must, of course, be of the type wherein the initiator species is generated in the aqueous phase of the reaction mixture in which the substrate and monomer are present. In this manner, grafting takes place by generation of radical sites directly on the polysaccharide substrates or by chain transfer to the substrate. Suitable catalyst systems useful herein are those such as ceric ammonium nitrate; hydrogen peroxide/ferrous salt; inorganic alkali metal or ammonium persulfates; organic hydroperoxides, etc. They may be used alone or in the form of redox pairs, i.e., in admixture with compounds having a reducing effect, for example, alkali metabisulfites or sodium formaldehyde sulfoxylate. The preferred catalysts are the ammonium or potassium persulfate salts. The concentration of catalyst employed may range from 0.1 to 2% based on the weight of the polysaccharide component of the graft. The catalyst may be added directly to the aqueous monomer solution or added to the entire reaction mixture as a separate catalyst solution. Alternatively, if the catalyst is a redox pair consisting of water soluble component and a solvent soluble component, such components are added to the respective reaction phases. The desired grafting may also be initiated by irradiation of the reaction mixture.

As indicated hereinabove, the surfactant or surfactants used in the preparation of the graft copolymer is an integral part of the present invention. It is known in the polysaccharide art that surfactants tend to react with polysaccharides (some more than others) such that the water-dispersibility of the polysaccharide is reduced by the presence of the surfactant. (See, for example, Gray, Virginia M., et al., *Die Starke* 14, p. 239-246, (1962)). The polysaccharide and surfactant form a complex reducing the water-dispersibility of the polysaccharide relative to its dispersibility in the absence of the surfactant. While applicants do not wish to be bound to any one theory as to the basis for the operability of the present invention, it is believed that the ability of providing the present graft polymer is related to the reduction of the water dispersibility of the polysaccharides by the presence of the surfactant and in that manner avoids the viscosity problems of prior art processes using aqueous media. In the absence of the surfactant, the graft beads will coagulate during polymerization thereby destroying the suspension characteristics of the reaction mixture and rendering the polymer intractable.

In general, any type of surfactant, i.e. nonionic, anionic or cationic, may be employed in the present invention with the anionic and nonionic surfactants being preferred. Particularly suitable surfactants are the oil-soluble polyhydroxyethylated compounds known an nonionic surfactants for example, hydroxyethylated nonyl phenols, hydroxyethylated long-chain monocarboxylic acids and fatty acids, fatty acid esters of sorbitol and hydroxyethylated fatty acid esters of sorbitol. The usually applied cationically active and anionically active emulsifiers, such as the alkyl aryl sulfonates, linear alkyl sulfonates and sulfates, for example, lauryl sulfate or sulfosuccinic acid ester, may also be used, if desired, instead of or in admixture with substances of the nonionic type. Such suitable surfactants are available under the tradenames Calsoft 30 (Pilot Chemical Co.), Span 60 and 80 (Hercules, Inc.), Brij 92 (Hercules Inc.), Igepal 990 (GAF), Triton X405 (Rohm and Haas Co.), etc. The suitability of a specific surfactant for its use in the present invention may be easily ascertained by preparing an aliquot of the intended mixture to determine if a stable suspension is formed. Specifically, however, the choice of the particular surfactant (or surfactants) to be employed will depend on a number of factors including the nature of the continuous phase, the ratio of polysaccharide to water-soluble monomer, the monomer or monomers used to produce the graft, the concentration of monomer(s) in the aqueous phase; the type of polymerization substrate utilized; and the pH conditions under which the polymerization reaction occurs. If a water-soluble surfactant is employed, it is incorporated into the aqueous phase and used in amounts of 0.5 to 12% based on the weight of the polysaccharide substrate. When a solvent-soluble surfactant is employed, it is incorporated into the homogeneous phase at levels of 1–12% based on the weight of the solvent. When both types of surfactants are employed, they are added to the respective phases generally within the same levels disclosed hereinabove.

Other additives conventionally used by those skilled in the art in the graft polymerization reaction will generally be added to the aqueous monomer solution. Thus, if buffers are required to regulate the pH, as is the case when anionic or a mixture of anionic and cationic monomers are employed, such buffers should be added to the aqueous monomer solution.

In accordance with a typical graft copolymerization reaction, the monomer solution, polysaccharide suspension and catalyst together with any additional components, are combined in a vessel provided with stirring means under an inert atmosphere, such as is provided by evacuation of air with nitrogen. The order of addition of the separate components is not critical, however, both phases should be at substantially room temperature when combined. The polymerization reaction is not limited to a "single charge" technique and several variations in the combining of the components of the reaction may be employed. For example, the monomer solution and a separate aqueous solution of the catalyst may be each slow-added to the polysaccharide suspension (usually over a period of 15–60 minutes). Likewise, the monomer solution containing the catalyst may be slow-added to the polysaccharide suspension.

The concentration of monomer(s), substrate, buffer(s) and catalyst in the aqueous phase is designed to be in the range of 50–90% and preferably 60–80% solids, by weight, by varying the amount of water used to prepare the solution. The concentration of "polymer" (i.e. substrate and monomer) in the continuous phase is designed at 15–50% solids, by weight, by adjusting the amount of organic solvent. The reaction mixture is deoxygenated and heated to the appropriate temperature (within about 40° to 100° C.) to initiate polymerization. Polymerization is continued at this elevated temperature with stirring until the desired degree of conversion and grafting has been achieved (usually after ½ to 6 hours, depending upon the method of initiation). At the end of this period, the beads are filtered off from the continuous phase, (washed with an inert solvent, if desired) and dried. Drying is accomplished using conventional methods, as in a vacuum dryer, a whirling layer drying apparatus or a roller dryer. After filtration, the filtrate can readily be recycled for the next polymerization batch.

The products which result from carrying out the graft polymerization in accordance with the process of the present invention are distinct in several respects from those prepared by the methods of the prior art due primarily to the high degree of grafting efficiency and high conversion of substrate achieved with the process.

In the following examples, which are merely illustrative of the various embodiments of the present invention, all parts are by weight and all temperatures in degrees Celsius unless otherwise indicated.

EXAMPLE 1

This example illustrates the preparation of a graft copolymer of waxy maize corn starch, acrylamide, acrylic acid and dimethyldiallyl ammonium chloride according to the method of the present invention.

A two-liter round bottom flask reaction vessel equipped with a mechanical agitator, a reflux condenser, thermometer and a port for additions was charged with 590 g. of Isopar E (petroleum solvent composed principally of $C_8$ isoparaffins, B.P. 240–287° F.), 32 g. of Span 80 (Sorbitan monooleate) and 204.6 g. of an 80 fluidity waxy maize corn starch (moisture content 12%).

In a separate vessel a monomer solution was prepared by mixing 71.1 g. acrylamide, 9.0 g. acrylic acid, 62.7 g. of a 64.1% aqueous solution of dimethyldiallyl ammonium chloride, 4.0 g. of a 1% tetrasodium ethylene diamine tetraacetic acid solution, 10.0 g. linear sodium dodecyl benzene sulfonate and 64.8 g. water. This solution was adjusted to pH 8.3 with 9.9 ml 12.6N sodium hydroxide.

The monomer solution was added over a ½ hour period at 25° C. to the agitated starch, surfactant, solvent mixture in the reactor. After the addition, the reaction mixture consisted of small beads suspended in the solvent medium.

A solution containing 1.08 g. ammonium persulfate, 3.24 g. disodium hydrogen phosphate and 15 g. of water was slowly added to the reactor over a ½ hour period. The mixture was then deoxygenated by alternate evacuation (200 mm Hg) and repressurization to atmospheric pressure using nitrogen. While maintaining a positive nitrogen pressure, the reaction mixture was heated to 60–65° C. for a 1 hour period. The polymerization reaction was initiated at 60° C. as evidenced by an exothermic reaction. The reaction mixture was maintained at 65–70° C. during the exotherm and thereafter for an additional 4 hours. At the end of this period, the reaction mixture was cooled and the polymer beads were recovered by filtration and drying. The dry product consisted of free flowing uniform beads. The yield was 320 g. at 95% solids. The polymer was dispersed (2% solids) in water, heated in a boiling water bath for 20 minutes and dialyzed against distilled water. After dialysis the polymer was determined to have a nitrogen content of 5.3% and an I.V. of 1.52 dl/g. measured in 1N KCl. The monomer conversion was calculated to be 93% and the efficiency of grafting was 85%.

EXAMPLE 2–8

Using the process described in Example 1, graft copolymers were prepared using the components, amounts and reaction conditions shown in Table I.

TABLE I

| | Examples | | | | | | |
|---|---|---|---|---|---|---|---|
| | 2 | 3 | 4 | 5 | 6 | 7 | 8 |
| Monomer solution | | | | | | | |
| acrylamide | 34.5 | 18.3 | 8.2 | 26.6 | 26.2 | 21 20.3 | 20.2 |
| methacryloxyethyl trimethyl ammonium methosulfate (80%) | | | | | | | |
| methacrylamidopropyl trimethyl ammonium chloride (50%) | | | | | | | 34 |
| dimethyldiallyl ammonium chloride (67%) | 33 | 30.5 | 19 | 16.3 | 16.2 | | |

TABLE I-continued

|  | Examples | | | | | | |
|---|---|---|---|---|---|---|---|
|  | 2 | 3 | 4 | 5 | 6 | 7 | 8 |
| acrylic acid | 3.3 | 2.8 | 5.2 |  |  |  | 2.8 |
| methacrylic acid |  |  |  |  |  | 2.8 |  |
| NaOH (12.65 N) | 3.6 | 3.1 | 5.7 |  | 2.9 | 3.1 | 3.0 |
| sodium dodecyl benzene sulfonate (20% aqueous soln.) (Calsoft 30) |  | 25 | 25 | 13 | 18.8 | 30 | 6.3 |
| $H_2O$ | 20 |  |  | 5.2 | 1.5 |  | 14 |
| Versene (1%) Dow Chemical Corp. |  | 2.0 | 1.7 |  |  | 2.0 | 1.0 |
| Polymer substrate |  |  |  |  |  |  |  |
| waxy maize starch (85 fluidity) | 45.5 | 68.2 | 85.3 |  |  |  | 68.2 |
| potato starch |  |  |  | 44.1 |  |  |  |
| hydroxypropyl derivatized corn starch (D.S. 0.2) |  |  |  |  | 42.3 |  |  |
| acid converted corn starch |  |  |  |  |  | 68.2 |  |
| Organic phase (containing polymer substrate) |  |  |  |  |  |  |  |
| sorbitan monooleate (Span 80) | 20 |  | 30 |  |  |  | 13 |
| ethoxylated fatty alcohol (Brij 92) |  | 20 |  |  |  |  |  |
| sorbitan monooleate (Span 60) |  |  |  |  |  | 20 |  |
| xylene | 175 |  |  |  |  |  |  |
| toluene |  |  |  | 175 | 175 |  |  |
| Isopar E ($C_8$ isoparaffin solvent) (Exxon Corp. |  | 200 | 200 |  |  | 200 | 254 |
| Catalyst and Buffers |  |  |  |  |  |  |  |
| $(NH_4)_2S_2O_8$ | 0.15 | 0.24 | 0.3 |  |  | 0.45 | 0.36 |
| $K_2S_2O_8$ |  |  |  | 0.38* | 0.38* |  |  |
| $H_2O$ | 5 | 5 | 5 |  |  | 9.8 | 5.0 |
| $Na_2HPO_4$ |  |  |  |  |  | 1.35 | 1.08 |
| Conditions and Product Characteristics |  |  |  |  |  |  |  |
| pH (monomer) | 8.2 | 8.3 | 8.2 | 8,3 | 8.3 | 8.4 | 8.2 |
| Temperature (° C.) | 65–70 | 65–70 | 65–70 | 70–72 | 60–65 | 60–65 | 65–70 |
| Time (hours) | 4 | 5 | 5 | 2 | 2 | 4 | 5 |
| Monomer Conversion (%) | 95 | 93 | 94 | 90 | 85 | 97 | 99 |
| I.V. (IN KCl) (dl/g.) | 1.2 | 1.0 | 0.6 | 1.43 | 1.44 | 1.03 | 1.72 |

*Catalyst added directly to monomer solution.

EXAMPLE 9

This example illustrates the utility of selected cationic grafts prepared by the method of the present invention in retention of pigment during the paper making process.

Bleached softwood sulfate cellulose pulp (360 g.) was refined in water until a 1½% (wt./vol.) slurry had a Canadian Standard Freeness of 600. To the refined pulp slurry was added 36 g. $TiO_2$ and the water hardness was adjusted to ppm. The adjusted pulp slurry was then diluted to a final consistency of 0.5% (wt./vol.) of pulp.

Enough pulp slurry to produce a 3.5 g. sheet (approx. 700 ml) was added to a beaker and agitated with a mechanical mixer. At this point, the pH was adjusted as necessary using Papermaker's Alum for trials at pH 7.5, 6.0 and 4.5. The slurries were then treated with dilute aqueous solutions in various concentrations (as indicated) of the appropriate retention aid and mixed for 30 seconds to 1 minute.

The treated slurry was then introduced to a Noble and Wood head box containing about 10 liters of water and mixed manually. The box was evacuated and drained and the sheets pressed in a felt blotter type roller, and dried. The amount of pigment retained in the sheet was determined (by an isotope technique) and expressed as percent of the theoretical amount.

Test results of two starch graft copolymers prepared as described above and tested as retention aids at a 0.01% and 0.03% level of addition at pH 7.5 (0% alum), pH 6.0 (4% alum) and pH 4.5 (11% alum) are tabulated in Table II as % Pigment retained. The graft copolymers of the invention are compared to a typical 100% synthetic commercial retention aid and to a graft copolymer employing the composition of Example I, but prepared in accordance with a conventional aqueous grafting method.

Table II

| Sample Tested | % Addition | % TiO₂ Pigment Retained | | |
|---|---|---|---|---|
|  |  | 0% Alum | 4% Alum | 11% Alum |
| Blank | — | 26.5 | 39.5 | 40.5 |
| Standard* | 0.01 | 68.0 | 68.5 | 64.5 |
|  | 0.03 | 73.0 | 74.5 | 66.5 |
| Solution Graft Copolymer** | 0.01 | 42 | 50 | 54 |
|  | 0.03 | 50 | 56 | 59 |
| Example I Copolymer | 0.01 | 61.0 | 69.5 | 74.0 |
|  | 0.03 | 63.5 | 75.0 | 77.0 |
| Example III Copolymer | 0.01 | 58.0 | 60.5 | 64.5 |
|  | 0.03 | 62.0 | 64.5 | 67.5 |

*Amphoteric acrylamide copolymer (Betz 1260).
**Composition of Example I prepared by a solution graft technique.

EXAMPLE 10

This example illustrates the preparation of a graft copolymer of waxy maize corn starch and acrylamide according to the method of the present invention wherein a surfactant is employed in only the monomer solution.

A 500 ml round bottom flask reaction vessel equipped with a stirrer, thermometer, condenser and port for addition was charged with 250 ml toluene, and 67.8 g. of waxy maize corn starch (non-converted) containing 12% moisture was then sifted in. In a separate beaker, a solution was prepared to contain 15 g. acrylamide mixed with 28.6 g. water and 7.5 g. commercial sodium lauryl sulfate flakes. This solution was slowly added from a dropping funnel to the starch suspension over a 15 minute period. After the addition, the reaction mixture consisted of small beads suspended in the solvent.

The reaction mixture was deoxygenated by passing nitrogen gas under the liquid level at 50 ml/min. for 15 minutes. At the end of the purge, the nitrogen rate was reduced to 10 ml/min. About 3 ml of 0.5 N ceric ammonium nitrate (in 1 N $NH_4NO_3$) was delivered to the reaction mixture from a syringe. The temperature of the reaction mixture increased from 25° to 35° C. and was cooled to 30-32° C. with an ice-water bath. The exotherm lasted for 30 minutes after which the reaction mixture was warmed to 30° C. and held for an additional 1 hour.

The graft copolymer was quantitatively recovered by filtration as small, off-white, uniform beads and dried 1 hour at 60° C. The copolymer was heated at 2.5% solids in water for 20 minutes and thereafter dialyzed at pH 7. The nitrogen content after dialysis was 3.82% indicating a 97% conversion of monomer. The grafting efficiency was determined to be 81%.

EXAMPLE 11

This example illustrates the preparation of a graft copolymer of a 50 fluidity corn starch, acrylamide and acrylic acid wherein a portion of the monomer and catalyst solutions were slow-added over a period of time according to one embodiment of the present invention.

A one-liter round bottom flask equipped with a mechanical agitator, thermometer, condenser and suitable sized equalized dropping funnels was charged with 200 g. Isopar E, 20 g. Span 80 and 45.5 g. of a 50 fluidity corn starch containing 12% water.

In a separate beaker a monomer solution was prepared to contain acrylamide (52.2 g.), acrylic acid (7.8 g.), sodium dodecyl benzene sulfonate (25 g. of a 20% aqueous solution), and water (10.1 g.). The pH of the monomer solution was adjusted to pH 8.3 with 18.2 N NaOH.

A catalyst solution was prepared by mixing 0.25 g. ammonium persulfate, 0.75 g. disodium hydrogen phosphate and 10.0 g. of water. To the flask containing the starch suspension was added 25% each of the monomer solution and the catalyst solution. The reaction flask was thereafter vacuum deoxygenated employing nitrogen and heated to 65-70° C. Once at temperature, the remaining portions of each solution were slow-added over a 2 hour period after which the reaction mixture was heated an additional 2 hours. The copolymer product was isolated by filtration as small uniform beads.

A 1% solution of the polymer in water had a viscosity of 300 cps. and a nitrogen content of 9.8% (after dialysis) indicating a 95% monomer conversion.

EXAMPLES 12-17

Using the slow-addition procedure essentially as described in Example 11, graft copolymers were prepared employing ingredients and conditions as given in Table III.

TABLE III

| | Examples | | | | | |
|---|---|---|---|---|---|---|
| | 12 | 13 | 14 | 15 | 16 | 17 |
| Monomer solution | | | | | | |
| acrylamide | 44.4 | 52.2 | | | 45 | |
| acrylic acid | 15.7 | 7.8 | | | 5 | |
| sodium styrene sulfonate | | | 20 | | | |
| sulfonatoethyl methacrylarte (Na salt) | | | | | | 25 |
| dipotassium methacryloxy ethyl phosphate | | | | 20 | | |
| sodium dodecyl benzene sulfonate (20% aq. soln.) | 25 | | 20 | | 5 | 35 |
| Igepal CO 990 | | | | 18 | | |
| Triton X405 (70% soln.) | | 7.1 | | | | |
| water | 15.5 | 35 | — | 56 | 32 | |
| Polysaccharide substrate | | | | | | |
| acid converted corn starch | 45.5 | | | | | |
| hydroxyethyl cellulose (low viscosity) | | | 80 | | | |
| waxy maize starch | | 45.5 | | | | |
| amylose | | | | 180 | | |
| xanthan gum | | | | | 50 | |
| guar gum | | | | | | 75 |
| Organic phase | | | | | | |
| Span 80 | | 20 | 15 | | 25 | |
| Tween 80 | 20 | | | | | |
| Isopar E | | 200 | 200 | 600 | 250 | |
| hexane | 200 | | | | | |
| toluene | | | | | | 300 |
| Catalyst and Buffers | | | | | | |
| K$_2$S$_2$O$_8$ | 0.25 | 0.25 | | | | |
| (NH$_4$)$_2$S$_2$O$_8$ | | | 0.48 | 0.9 | 0.25 | 0.3 |
| Na$_2$HPO$_4$ | 0.75 | 0.75 | 1.4 | 1.8 | 0.75 | 0.9 |
| water | 5.0 | 5.0 | 5.0 | 10.0 | 5.0 | 5.0 |
| Conditions | | | | | | |
| pH (monomer solution) | 8.5 | 8.3 | 7 | 7 | 8.2 | 6.0 |
| Temperature (° C.) | 70 | 65-70 | 70 | 70 | 70 | 70 |
| Time (hours) | 4 | 4 | 6 | 6 | 5 | 4 |

EXAMPLE 18

Using the slow-addition procedure essentially as described in Example 11, a cellulose-(g)-acrylamide copolymer was prepared and without isolation subsequently partially hydrolyzed with sodium hydroxide to introduce a carboxylic acid functionality.

The polysaccharide suspension contained 42 g. of α-cellulose powder, 200 g. Isopar G, and 20 g. of Span 80.

A monomer solution was prepared to contain 60 g. acrylamide, 9.9 g. of water and 25 g. of sodium dodecyl benzene sulfonate (20% aq. soln.). The buffered catalyst solution contained 0.25 g. of ammonium persulfate, 0.75 g. of Na$_2$HPO$_4$, and 10.0 g. of water.

As in Example 11, 25% each of the monomer solution and the catalyst solution were initially added to a reaction flask containing the polysaccharide suspension. The procedure of Example 11 was followed to produce the final copolymer intermediate after about 4 hours reaction time. After the polymerization step, 24.0 ml of 18.2 N sodium hydroxide was slowly added to the hot mixture (65–70° C.) over a 1 hour period. Hydrolysis was continued for an additional 2 hours maintaining the temperature at 65–70° C. The hydrolyzed copolymer was thereafter isolated as uniform, fine, off-white beads by filtration, washed and dried.

In summary, a process for preparing highly substituted graft copolymers of polysaccharides is provided, which process employs a two-phase reaction system and controlled conditions. The process provides a high grafting efficiency of water soluble monomers to polysaccharide substrates and yields highly converted graft copolymers not obtainable with known methods.

We claim:

1. A process for the production of a graft copolymer of a polysaccharide and water-soluble monomer comprising the steps of:
   (a) suspending the polysaccharide in an organic solvent, which solvent has a boiling point at or above the temperature of the polymerization reaction, is immiscible with water and does not dissolve the polysaccharide, monomer or graft copolymer;
   (b) adding thereto an aqueous solution of the monomer thereby forming a suspension of discrete aqueous spheres in the organic solvent phase;
   (c) deoxygenating and heating the reaction mixture in the presence of a free radical polymerization catalyst to a temperature of 40 to 100° C. to initiate polymerization;
   (d) continuing the polymerization for from 0.5 to 6 hours; and
   (e) isolating the resultant graft copolymer from the reaction mixture in the form of solid beads; wherein it is required that either the aqueous solution or the polysaccharide suspension or both contain a cationic, anionic or nonionic surfactant, that the solids content of the aqueous polymerization mixture is greater than 50% by weight, and that the polysaccharide be present in the final graft copolymer in an amount of from 10 to 90% by weight.

2. The process of claim 1 wherein the monomer solution contains a water-soluble surfactant in an amount of 0.5 to 12% by weight of the polysaccharide substrate.

3. The process of claim 1 wherein the polysaccharide suspension contains a solvent-soluble surfactant in an amount of 1 to 12% by weight of the organic solvent.

4. The process of claim 1 wherein the surfactant is selected from the group consisting of hydroxyethylated nonyl phenols, hydroxyethylated long-chain monocarboxylic acids, hydroxyethylated long-chain fatty acids, fatty acid esters of sorbitol, hydroxyethylated fatty acid esters of sorbitol, alkyl aryl sulfonates, linear alkyl sulfonates and linear alkyl sulfates.

5. The process of claim 1 wherein the water-soluble monomer is selected from the group consisting of acrylic acid, methacrylic acid, acrylamide, methacryloxyethyl trimethyl ammonium methosulfate, methacrylamidopropyl trimethyl ammonium chloride, ammonium styrene sulfonate, sodium styrene sulfonate, sulfonatoethyl methacrylate, dimethyldiallyl ammonium chloride, dipotassium methacryloxyethyl phosphate, vinyl pyrrolidone, hydroxymethyl acrylate, hydroxyethyl acrylate, hydroxypropyl acrylate and sodium 2-acrylamide-2-methyl propane sulfonate.

6. The process of claim 1 wherein the polysaccharide is a starch or starch conversion product.

7. The process of claim 1 wherein the polysaccharide is cellulose or a cellulose derivative or a plant gum.

8. The process of claim 1 wherein the polysaccharide is present in the final graft copolymer in an amount of 40–70% by weight.

9. The process of claim 1 wherein the solids content is within the range of 60 to 80% by weight of the aqueous polymerization system.

10. The process of claim 1 wherein the organic solvent is selected from the group consisting of benzene, dichlorobenzene, toluene, xylene, 1,2-dichloroethane, heptane, octane, isooctane and nonane.

11. The graft copolymer produced by the process of claim 1.

* * * * *